United States Patent
Dittmer et al.

(10) Patent No.: US 6,314,009 B1
(45) Date of Patent: Nov. 6, 2001

(54) DEVICE AND METHOD FOR CONTROLLED PARALLEL OPERATION OF DIRECT CURRENT CONVERTERS

(75) Inventors: Bernd Dittmer, Ludwigsburg; Roman Gronbach; Reinhard Rieger, both of Stuttgart; Richard Schoettle, Muehlacker, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,021

(22) PCT Filed: Feb. 11, 1999

(86) PCT No.: PCT/DE99/00373

§ 371 Date: Sep. 5, 2000

§ 102(e) Date: Sep. 5, 2000

(87) PCT Pub. No.: WO99/41816

PCT Pub. Date: Aug. 19, 1999

(30) Foreign Application Priority Data

Feb. 13, 1998 (DE) .............................................. 198 05 926

(51) Int. Cl.$^7$ .................................................... H02M 3/00
(52) U.S. Cl. ............................................................. 363/65
(58) Field of Search ................................... 363/65, 67, 69, 363/70, 71

(56) References Cited

U.S. PATENT DOCUMENTS

| | | | |
|---|---|---|---|
| 4,924,170 | 5/1990 | Henze . | |
| 5,768,117 | * 6/1998 | Takahashi et al. | 363/65 |
| 6,014,322 | * 1/2000 | Higashi et al. | 363/65 |
| 6,166,934 | * 12/2000 | Kajouke et al. | 363/65 |

OTHER PUBLICATIONS

Wu T F et al "Reliability Improvement in Parallel Connected Converter System", Proceedings of the International Conference on Industrial Electroni Control and Instrumentation, Kobe, Oct. 28–Nov. 1, 1991, vol. 1, No. Conf. 17, Oct. 28, 1991, pp. 429–434.

* cited by examiner

Primary Examiner—Adolf Deneke Berhane
(74) Attorney, Agent, or Firm—Michael J. Striker

(57) ABSTRACT

Apparatuses and methods are disclosed for controlled parallel operation of direct current converters, particularly in a multi voltage vehicle electrical system, with two voltage ranges (U1) and (U2). The parallel-connected voltage converters are disposed between the voltage ranges; in this connection, only one of the voltage converters is embodied as an active voltage regulator that functions all the time. The other (n−1) converters function either in full load operation or no load operation depending on the required power demand.

14 Claims, 2 Drawing Sheets

DEVICE AND METHOD FOR CONTROLLED PARALLEL OPERATION OF DIRECT CURRENT CONVERTERS

PRIOR ART

In order to increase the power of DC/DC Converters, they are operated in master/slave mode. In master/slave mode, the so-called master executes overriding control of the tasks in regulating the overall system. The subordinate converter (s) (slaves) function in controlled operation, which results in a multiplication of the electrical output potential. The control of the slave converter can be achieved, for example, through the transmission of switching commands for electrical valves (e.g. control signals of the switching transistors).

THE PROBLEM

DC/DC converters are used to produce one or more voltage potentials or for energy transmission between two different voltage potentials (e.g. 14V/42V dual-voltage vehicle electric systems). The output side parallel connection of n individual converter modules is suitable for flexible reaction to the desired maximal output power. FIG. 1 shows an apparatus of this kind.

For example, the input voltage side is connected to the generator of the vehicle. If each converter has a separate voltage regulator, then coupling oscillations can occur as a result of the output side connection.

OBJECT OF THE INVENTION

The object of the invention is comprised of increasing the power of direct current converters (DC/DC converters) by means of controlled parallel operation of a number of individual converters while simultaneously preventing coupling oscillations. This object is attained by means of the apparatuses and methods for controlled parallel operation of direct current converters disclosed in the main claim and the dependent claims.

ADVANTAGES OF THE INVENTION

The principle of load sharing demonstrated and claimed in claim 1 advantageously prevents the danger of coupling oscillations in voltage regulators operating in parallel. The disposition of the converters can be embodied both close together or spaced apart. In contrast to the known method, a data exchange only has to take place between the converters when they are switched. A low bandwidth connection (e.g. CAN) is sufficient for this purpose. The serial control structure has the advantage that it permits an identical design of the converters.

Other advantages of the invention are achieved by means of the measures taken in the dependent claims.

DRAWINGS

Exemplary embodiments of the invention are shown in the drawings and will be explained in detail in the subsequent description.

DESCRIPTION

Figure 1:
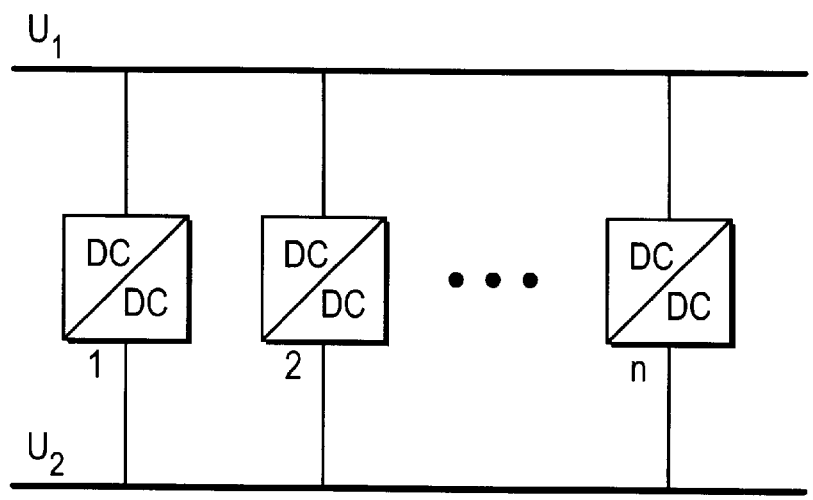
FIG. 1 shows the modular parallel connection of a number of converters.

FIG. 1 shows how a modular parallel connection of a number of DC/DC converters, 1, 2, ..., n, which is suitable for the flexible reaction to a desired maximal output power and can be used for the invention. The input voltage, for example the electrical system voltage of a vehicle, is labeled U1, the output voltage of the DC/DC converter is labeled U2. In a dual-voltage vehicle electrical system, the associated voltages are 14 and 42 volts, for example.

If each of the DC/DC converters 1, 2, ..., n has a separate voltage regulator, coupling oscillations can occur as a result of the output-side connection. A reduction to a single active voltage regulator is recommended in order to prevent reciprocal regulator influence. The required power demand is shared among (n−1) converters, which function either in full load operation or in no load operation, and an additional converter, which carries out the voltage regulation in the partial load range.

Figure 2:
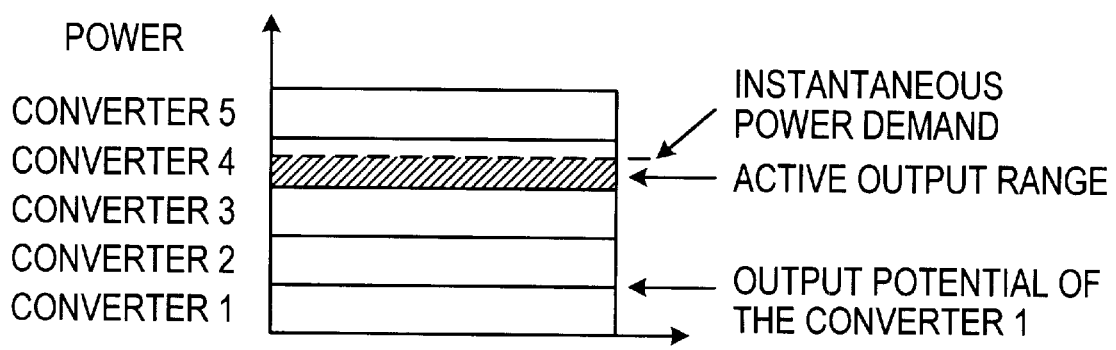
FIG. 2 shows an example of the distribution of an instantaneous power demand.

FIG. 2 shows an example of the load distribution among five parallel converters. The converters 1, 2, and 3 function in full load operation and supply their maximal output current on the output side. The converter 4 takes over the voltage regulation and covers the "active" power range. The converter 5 functions in no load operation.

The regulation strategy can be expressed as follows:

If a single converter is sufficient to cover the power demand, then it carries out the regulation of the output voltage. The other converters are not operational.

If the power demand exceeds the capacity of an individual converter (converter 1), this converter transfers the voltage regulation to the next converter (converter 2). Converter 1 switches into full load operation and supplies its maximal output current.

With a further increase in power demand, successively more converters are switched into full load operation. Another converter respectively assumes the remaining partial load.

In the opposite case of a decreasing power demand, the converters are successively switched from full load operation back into partial load operation.

The following control structures can be used in order to achieve this:

Hierarchical Control Structure

Figure 3:
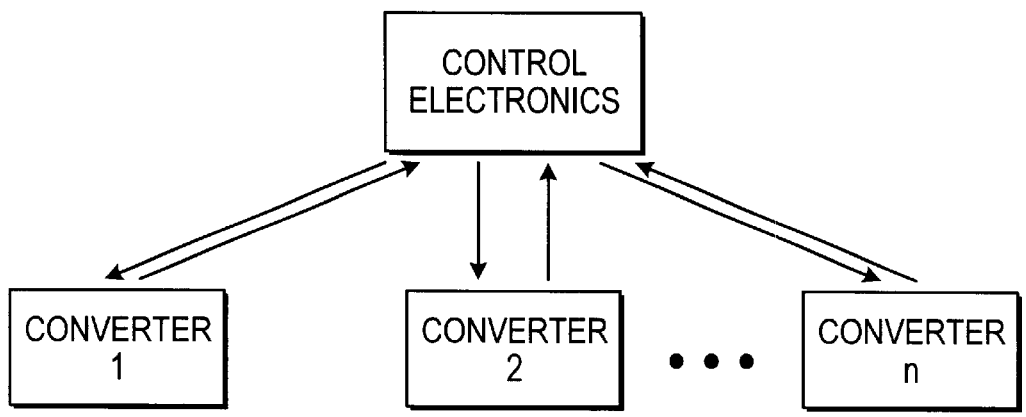
FIG. 3 shows a hierarchical control structure.

When using a hierarchical control structure, a set of central control electronics carry out the coordination of individual converters. From the respectively active voltage-regulating converter, it receives information regarding its instantaneous output power and switches the remaining converters into full load or no load operation. FIG. 3 shows a hierarchical control structure of this kind. The associated control electronics 6 can, for example, also be integrated into a converter, for example into the converter 1. The exchange of data can take place bidirectionally via a serial bus (e.g. CAN) or via separate signal lines 7, 8, 9.

Some DC/DC converters cannot function in no load operation. They require a base load on the output side. In this case, the switching thresholds for the transfer of the voltage regulation from one converter to the next must be adapted. Then the switch-on threshold when there is increasing demand is not $P=P_{max}$, but is $P=P_{max}-P_{base}$. In this case, the switch-off threshold when there is decreasing demand is identical to the base load $P_{base}$.

If the maximum efficiency of the converter used lies in the partial load range, then in order to optimize efficiency, the controlled converters can also be operated in this partial load range. The control signal for this is predetermined by the central control electronics 6. If the total power output is insufficient, then the output of the controlled converters can subsequently be increased to the maximal power.

Serial Structure (Control Structure)

Figure 4:
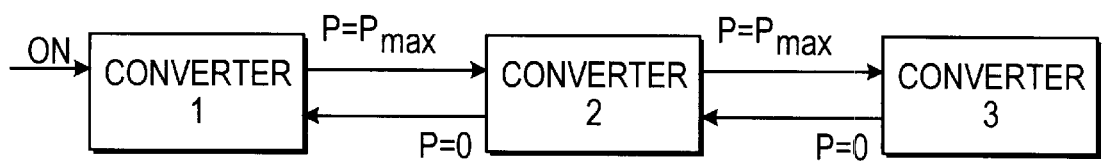
FIG. 4 shows the apparatus with a serial control structure.

When using a serial structure as shown in FIG. 4, the central control electronics according to FIG. 3 can be omitted. All of the converters can be embodied identically. The connections are produced solely by means of the external wiring.

The starting of the system can take place, for example, by means of a switch-on command ON for the first converter in the sequence. This converter takes over the voltage regulation. If converter 1 reaches its power limit, the transfer of the voltage regulation to converter 2 is initiated by the signal $P=P_{max}$. This is a signal for the arrival at maximal power. This means that the converter 1 is producing its maximal power or its maximal current at the output. Increasing power demand results in a successive transfer of the voltage regulation by means of the signal $P=P_{max}$.

In the event of decreasing power demand, the instantaneously active voltage regulating converter signals the preceding converter that it has reached its no load state by means of the datum P=0. The preceding converter then functions as a voltage regulator. The converters are thus gradually switched into no load operation, starting from converter 3 down to converter 1 in the example shown.

As has already been explained in connection with the embodiment according to FIG. 3, the base load or the point of maximal efficiency can also be used as a switching threshold.

The exchange of data can likewise take place via a serial bus (e.g. CAN) or via separate signal lines.

The apparatus demonstrated and/or the associated methods for controlled parallel operation of voltage converters (DC/DC converters) can be used, for example, in vehicle electrical systems; however, they are also suitable for other applications which depend on the conversion of high power outputs. It is essential that one of the converters operates in the active range and all the other converters operate either in the full load range or in the no load range.

What is claimed is:

1. An apparatus and method for controlled parallel operation of direct-current converters, particularly in a multivoltage vehicle electrical system, with two voltage ranges (U1) and (U2), between which the parallel-connected voltage converters are disposed, characterized in that only one of the voltage converters is embodied as an active voltage regulator and the other (n−1) converters function either in full load operation or in no load operation, depending on the required power demand.

2. The apparatus and method according claim 1, characterized in that the first converter or another converter takes over the voltage regulation in the partial load range.

3. The apparatus and method according claim 1, characterized in that the load distribution with a presettable number of parallel converters takes place so that the converters (1), (2), and (3) operate in the full load range and supply their maximal output current on the output side, that the converter (4) carries out a voltage regulation and covers the active or variable power range, and the converter (5) functions in no load operation.

4. The apparatus and method according to claim 1, characterized in that with a low power demand, only one converter is operative, in particular the first, and carries out the regulation of the output voltage while the other converters are not operative.

5. The apparatus and method according claim 4, characterized in that if the power demand exceeds the capacity of an individual converter, this converter switches into full load operation, supplying its maximal output current, and transfers the voltage regulation to the next converter.

6. The apparatus and method according claim 4, characterized in that with a further increase in demand, additional converters are switched into full load operation and the respectively subsequent converter assumes the partial load and that with a decreasing power demand, the converters are successively switched from full load operation back into partial load operation.

7. The apparatus and method according to claim 1, characterized in that the converters are controlled via a hierarchical control structure by a set of control electronics, which controls all of the converters and receives data from them, where the data exchange takes place via a serial bus, in particular a CAN bus, or via separate signal lines.

8. The apparatus and method according to claim 7, characterized in that the control electronics are integrated into one of the converters.

9. The apparatus and method according claim 1, characterized in that presettable converters are operated with at least a base load on the output side and the switching thresholds for the transfer of the voltage regulation are adapted to this base load, and the switch-on threshold with increasing demand is $P=P_{max}-P_{base}$, while the switch-off threshold with decreasing demand corresponds to the base load.

10. The apparatus and method according claim 1, characterized in that presettable converters are operated in the partial load range so that a maximum efficiency is produced, where if need be, the power is increased to the maximal power by means of control signals from the central control electronics.

11. The apparatus and method according claim 1, characterized in that the converters are operated in a serial arrangement and are connected to one another, where each converter sends the subsequent converter a signal when it reaches its maximal power and receives from this subsequent converter a signal when it in turn reaches no load operation.

12. The apparatus and method according to claim 8, characterized in that the voltage regulation only takes place in one of the converters and when this converter reaches its full load, this voltage regulation is transferred successively to the subsequent converter.

13. The apparatus and method according claim 1, characterized in that the base load or point of the maximal efficiency is used as the threshold for the transfer of the voltage regulation or switching off.

14. The apparatus and method according claim 1, characterized in that the exchange of data takes place via a serial bus, in particular a CAN bus, or via separate signal lines.

* * * * *